R. L. WALKER.
AGRICULTURAL IMPLEMENT.
APPLICATION FILED OCT. 24, 1911.
1,065,990.
Patented July 1, 1913.
3 SHEETS—SHEET 1.
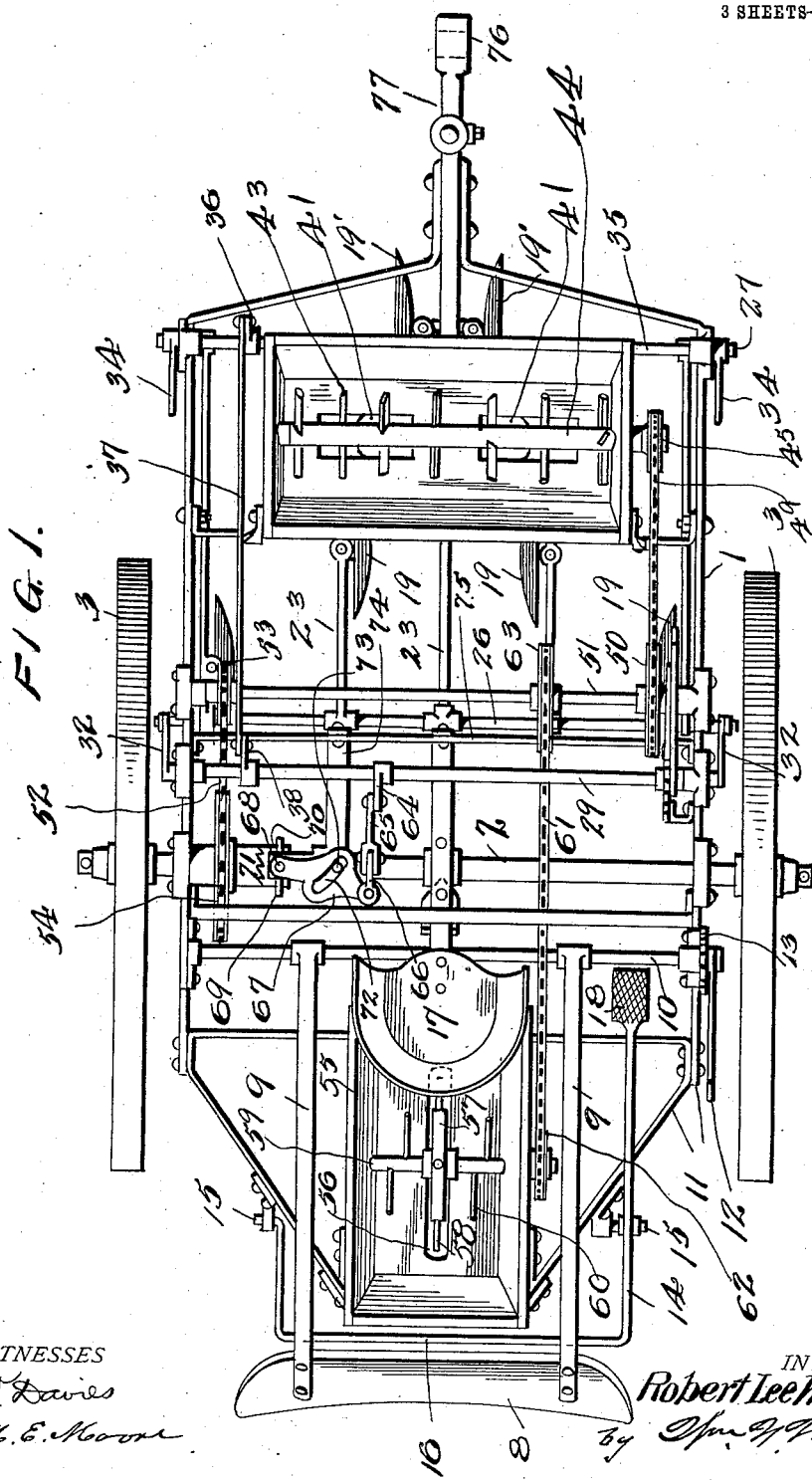
WITNESSES
C. N. Davies
M. E. Moore
INVENTOR
Robert Lee Walker
by *[signature]*
Attorney R. L. WALKER.
AGRICULTURAL IMPLEMENT.
APPLICATION FILED OCT. 24, 1911.
1,065,990.
Patented July 1, 1913.
3 SHEETS—SHEET 2.
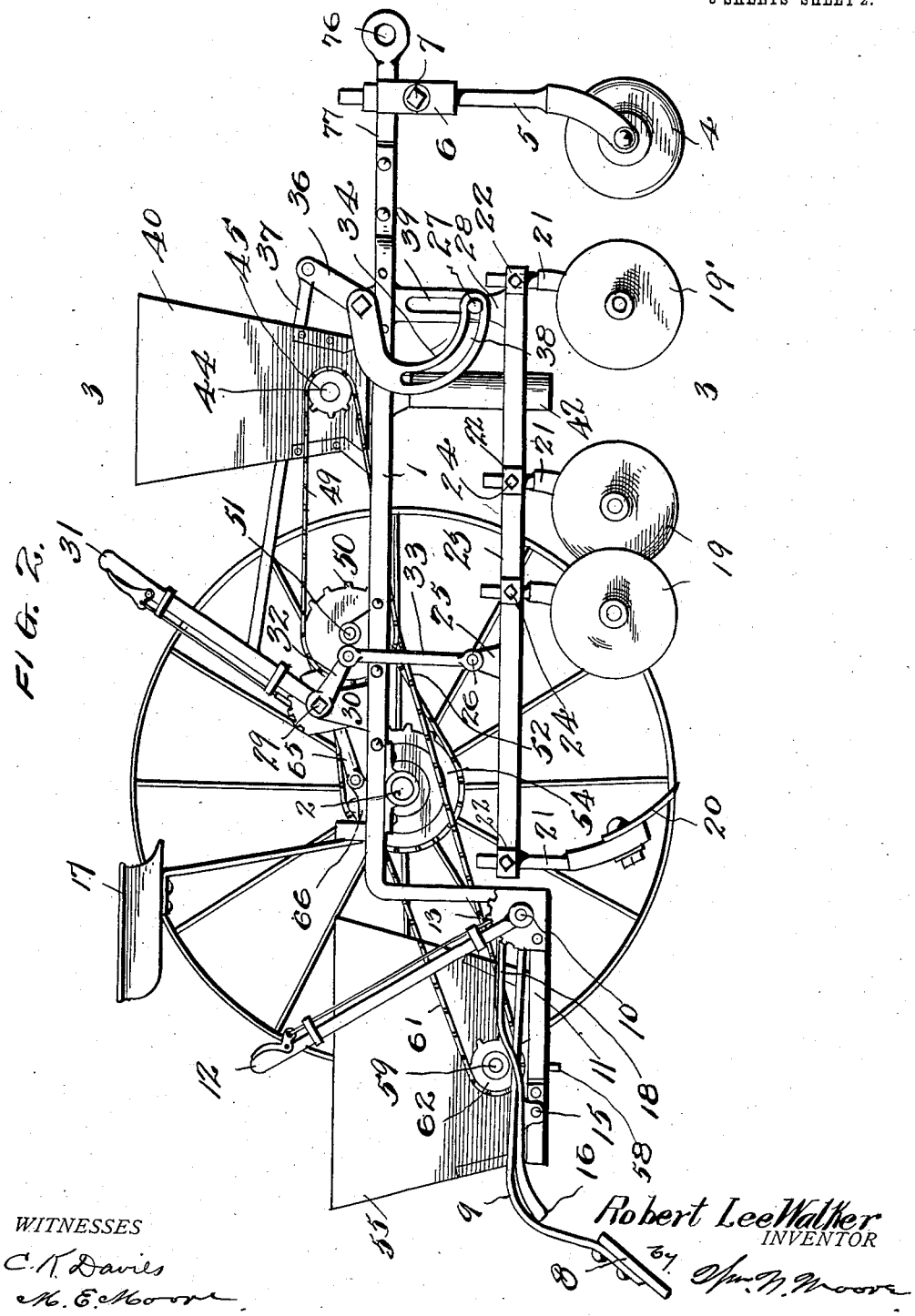
WITNESSES
C. K. Davies
M. E. Moore
Robert Lee Walker
INVENTOR
by Wm. N. Moore
Attorney

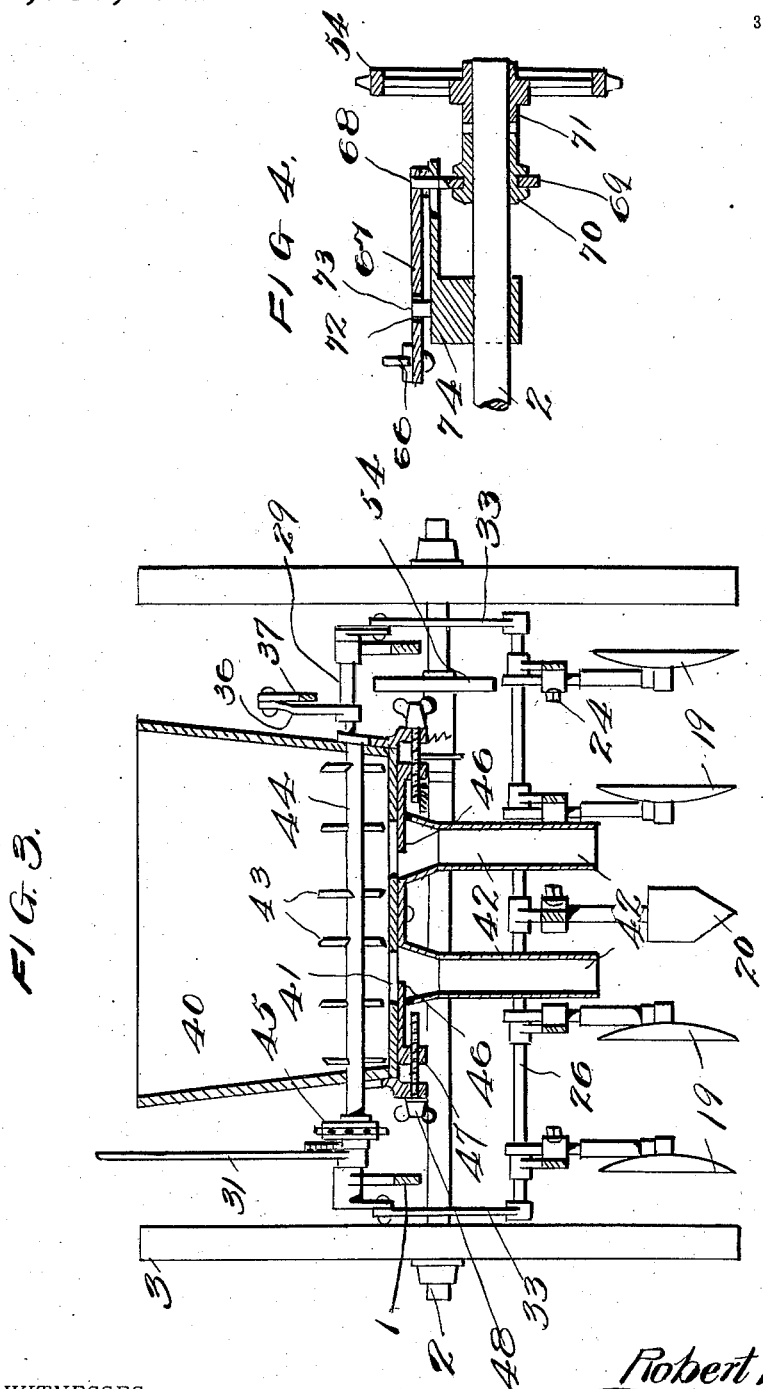

UNITED STATES PATENT OFFICE.

ROBERT LEE WALKER, OF COCHRAN, GEORGIA.

AGRICULTURAL IMPLEMENT.

1,065,990. Specification of Letters Patent. Patented July 1, 1913.

Application filed October 24, 1911. Serial No. 656,435.

*To all whom it may concern:*

Be it known that I, ROBERT LEE WALKER, a citizen of the United States, residing at Cochran, in the county of Pulaski and State of Georgia, have invented certain new and useful Improvements in Agricultural Implements, of which the following is a specification.

My invention relates to improvements in agricultural implements and is designed particularly for use as a cotton planter and fertilizer distributer.

The object of the invention is to improve implements of this character in certain constructions for producing an implement which embodies a cultivator, fertilizer and seed planter.

The invention consists in certain details of construction and combinations and arrangements of parts as hereinafter described and more particularly pointed out in the claims.

In the accompanying drawings I have illustrated one example of the physical embodiment of my invention constructed according to the best mode I have so far devised for the practical application of the principles.

Figure 1 is a plan view of an implement embodying my invention. Fig. 2 is a side elevation of Fig. 1 with the rear ground wheel removed for convenience in illustrating. Fig. 3 is a transverse vertical section on line 3—3, Fig. 2. Fig. 4 is an enlarged detail view of the clutch actuating mechanism.

In the preferred embodiment of my invention as illustrated in the drawings the frame 1 is supported upon the axle or shaft 2 upon which latter are journaled the ground wheels 3. Located at the forward end of the frame is a smaller wheel or roller 4, journaled in the fork shank 5, which is adjustably secured in the sleeve 6, by means of the set screw 7 in order that the wheel or roller may be adapted to travel in various depths of furrow.

At the rear of the machine is located the covering board 8. This board is connected by means of its arms or brackets 9—9 to the transverse rock shaft 10, which is journaled in the extension 11 of the main frame 1. The rock shaft 10 may be rotated by means of the hand lever 12 and inasmuch as the covering board 8 is rigidly attached to the rock shaft 10, it will be understood that rotation of the rock shaft by means of the lever 12 will lift the covering board from the ground and throw the board out of operative position, where it may be held permanently by means of the pawl and rack mechanism 13. For the purpose of lifting the covering board 8 in order to pass over irregularities in the ground, or rocks, or other obstructions, I provide a foot lever 14, which is fulcrumed at 15, to the extension 11 and has its cross-bar 16 in contact with the underside of the bracket arms 9. The operator sitting in the seat 17 may, when he desires to temporarily elevate the covering board, by lifting pawl 13 and depressing the treadle 18, lift the covering board 8 as will be understood.

For cultivating the ground it will be understood that I may employ either plows, disks, or other devices, but as herein illustrated, I have shown a series of cultivator disks 19, a double disk 19′, and a plow or furrow opener 20. The double disk cultivators 19′ are for the purpose of re-opening the furrows and the four disks 19, located at proper intervals each side of the center of the implement, are for turning the soil, as will be understood, and the plow 20 is for the purpose of opening the ground for the introduction of the cotton seeds. The disks 19 and plow 20 are supported as usual on the shanks 21, which are vertically adjustable in the sleeves 22, formed integrally with the beams 23. There are five of these beams 23 and the tools may be secured thereto in adjusted position by means of the set screws 24. Each of these beams is provided with a bracket 25 through which the rear rod 26 extends, for supporting the rear ends of the beams. The front ends of the beams are supported by means of the rod 27, which passes through the perforated brackets 28 on the beams 23.

In addition to the adjusting means already described for the disks and plow which are furnished by the set screws 24 and by which the disks and plow may be adjusted independently of each other, I also provide means by which all of the tools may be adjusted to different positions or thrown out of operation entirely. This operation is accomplished by means of the rock shaft 29, which is journaled in the bearings 30, carried by the main frame 1. The rock shaft may be moved by means of the lever 31 and by this movement the rocker arms 32, which are rigid with the rock shaft 29, pull up on the links 33, which are connected to the bar 26 at the rear of the beams 23. This action lifts the rear end of the beams, and the forward ends of the beams are simultaneously lifted through the medium of the slotted cam arms 34 in connection with the forward supporting bar 27. The cam arms 34 are secured on the forward rock bar 35 and this rock bar 35 is connected to the rear rock bar 29 by means of the rocker arm 36, draw rod 37 and rocker arm 38. In this manner with the tools in position indicated in Fig. 2, when the lever 31 is pulled over toward the rear of the implement, the beams and tools are bodily lifted from the ground, the cam arms 34 are turned on the rocker arm 35 as a pivot and as the cross-bar 27 travels in the slots 38 of the arm 34, the parts will be lifted, and to guide the movement of the bar 27 I provide the slotted bracket arms 39, which are rigid with the frame 1 of the implement.

Located near the front of the implement is the fertilizer distributer, which comprises a receptacle 40, having openings 41 in the bottom thereof, which communicate with the open spouts 42, which extend a suitable distance from the receptacle 40 toward the ground. I preferably employ guano as a fertilizer, and this material is stirred up and fed to the openings 41 by means of the arms 43, carried by the shaft 44, which extends through the lower portion of the receptacle 40, and has at its outer end a sprocket wheel 45. It will be observed that the stirring arms 43 are arranged on the shaft 44 in positions so that the material will be fed to the openings 41 in the bottom of the box or receptacle 40. The flow of material through the openings 41 may be regulated and adjusted by means of the slidable plats or cut-offs 46, which are formed with lugs 47 for the reception of the screw bars 48. By reference to Fig. 3 this construction will be apparent and readily understood.

The sprocket wheel 45 is rotated through the medium of the chain 49 and sprocket wheel 50 on the countershaft 51. And the countershaft 51 is rotated from the axle 2 by means of the chain 52 and sprocket wheels 53 and 54.

The seed planter comprises a receptacle 55 formed with an opening 56 in the bottom thereof, through which the seeds are passed by means of the wheel 57, formed with spokes 58. This wheel is supported upon shaft 59 which also has stirring arms 60 attached thereto. The shaft 59 is rotated from the countershaft 51 through the medium of sprocket chain 61 and sprocket wheels 62 and 63.

I have so constructed and arranged the different parts of the implement, so that when the disks are elevated from operative position, the same movement which accomplishes this action also throws out of operation the moving parts or mechanism of the implement. To attain this end I provide the rocker arm 64 on the rock shaft 29 and this arm is connected by a link 65 to the link 66. The link 66 is pivoted to the plate 67 at one end and the other end of said plate is pivoted at 68 to a collar 69, which is rotatable with reference to the clutch member 70, but immovable laterally thereto. The clutch member 70 is adapted to engage the complementary member 71 integral with the sprocket wheel 54. The plate 67 is provided with a slot 72, which is located so as to travel around the fixed pivot 73. This pivot 73 is preferably a stud or pintle projecting upwardly from the bracket 74, which is braced by means of the cross-bar 75, and at the other end is connected to the axle 2. Thus the forward movement of the lever 31, in lifting the plow beams and disks from the ground also, through the connections described, swings the slotted plate 67 on its pivot 70, and because of the location of the slot 72 and its relation to the fixed pivot 73, the movable pivot 68 is drawn toward the observer in Fig. 1 and the clutch members 70 and 71 disconnected. Inasmuch as the clutch member 71 and sprocket wheel 54 are loose on the axle, it will be understood that the disconnection of the clutch members will render the entire actuating mechanism inoperative.

It will be understood that the implement may be drawn by horse-power attached by means of a double-tree to the eye 76 in the beam 77. The double disks 19' for re-opening the furrow are located just in advance of the delivery spouts 42 for the guano, and the four listing disks follow the re-opening disks, and are spaced at regular and determined intervals. The plow 20 for opening the ground is located directly in front of the seeder and the seeds are dropped from the receptacle 55 in the furrow made by the plow. The covering board 8 follows directly in the path of the plow and dropped seeds, and performs the well-known function of covering the dropped seeds and fertilizer.

Having thus fully described my invention what I claim as new and desire to secure by Letters Patent is:

1. In an agricultural machine, the combination with a frame, axle, wheels and countershaft, of a seed planter and a fertilizer distributer mounted upon the frame and having direct driving connections with the countershaft, ground working tools adjustably supported from the frame, a rock shaft journaled upon the frame, a rocker arm thereon, a slotted plate mounted upon the axle, pivotal connections between the rocker arm and one end of the plate, a clutch member upon the axle, a collar rotatably mounted on the clutch member, a pivotal connection between the collar and slotted plate, a complementary clutch member adapted to engage said first-named clutch member, a bracket carrying a fixed pivotal point mounted upon the axle and about which as a center the slotted plate is adapted to work, a lever connected to the rock shaft, and connections between the lever and ground working tools whereby when the tools are elevated to inoperative position through the medium of the lever and connections the operating mechanism of the entire machine will be thrown out of operative position.

2. In combination with a main frame formed with a lower extension, an axle journaled in the main frame, a clutch mechanism thereon, a fertilizer distributer and a seed planter supported on the main frame, and extension, respectively, a countershaft, a driving connection between the axle and countershaft, driving connections between the countershaft and seed planter and distributer, a rock shaft journaled in the main frame, a series of longitudinally disposed bars carrying ground working tools supported from the main frame, and having a connection with the rock shaft, a connection between the clutch mechanism and the rock shaft, and a lever connected to the rock shaft for throwing the clutch and the ground working tools into and out of operation.

3. In an agricultural machine, the combination with a frame comprising a horizontal main portion formed with a lower rearwardly disposed extension parallel thereto, of an axle journaled in the main portion, a clutch mechanism thereon, a fertilizer distributer on the main portion, a seed planter on the extension, a countershaft journaled in the main portion, connections between the axle and countershaft, connections between the countershaft and distributer and seed planter, a rock shaft journaled in the main portion of the frame, and connected to said clutch mechanism on the axle, and a lever connected to said shaft for throwing the clutch mechanism into and out of operative position.

4. The combination of a frame, an axle journaled therein, clutch mechanism on said axle, material distributing elements on said frame, a countershaft driven from the axle, driving connections between said countershaft and distributing elements, a series of beams supported from the frame and carrying ground working tools, a rock shaft journaled in the frame, a lever thereon, cross bars for said beams arranged at each end thereof, connections between said cross bars and the rock shaft and lever for simultaneously lifting the forward and rear ends of said beams, and a connection between said rock shaft and clutch mechanism of the axle, whereby movement of the rock shaft to adjust the beams carrying the ground working tools will simultaneously move said clutch mechanism.

5. The combination of a frame, an axle journaled therein, clutch mechanism on said axle, material distributing elements on said frame, a countershaft for driving said distributing elements, a series of beams supported from the frame, and carrying ground working tools, cross bars for said frame, a rock shaft journaled in the frame, a lever therefor, connections between the rock shaft and cross bars and lever for simultaneously lifting the forward and rear ends of said beams, and a connection between said rock shaft and clutch mechanism and including a rocker arm, a pair of links, and a plate pivotally connected with the clutch mechanism whereby movement of the rock shaft to adjust the beams carrying the ground working tools will simultaneously move said clutch mechanism.

In testimony whereof I affix my signature in presence of two witnesses.

ROBERT LEE WALKER.

Witnesses:
C. N. Randitt,
W. T. Horner.

---

Copies of this patent may be obtained for five cents each, by addressing the "Commissioner of Patents, Washington, D. C."